(12) United States Patent  
Smich et al.

(10) Patent No.: US 7,171,852 B2
(45) Date of Patent: Feb. 6, 2007

(54) GAS METER OPERATION TRACKING ASSEMBLY

(75) Inventors: Andrew Smich, Mississauga (CA); John Z. Michalak, Mississauga (CA)

(73) Assignee: Romet Limited, Mississauga (CA)

( * ) Notice: Subject to any disclaimer, the term of this patent is extended or adjusted under 35 U.S.C. 154(b) by 0 days.

(21) Appl. No.: 11/189,775

(22) Filed: Jul. 27, 2005

(65) Prior Publication Data

US 2006/0032303 A1 Feb. 16, 2006

Related U.S. Application Data

(60) Provisional application No. 60/599,871, filed on Aug. 10, 2004.

(51) Int. Cl.
*G01F 3/04* (2006.01)
*G01F 1/07* (2006.01)
*G01F 1/115* (2006.01)

(52) U.S. Cl. ............... 73/261; 73/861; 73/861.88; 73/861.94

(58) Field of Classification Search ........... 73/261, 73/252
See application file for complete search history.

(56) References Cited

U.S. PATENT DOCUMENTS 3,457,835 A * 7/1969 Siebold ............... 418/7
4,406,163 A 9/1983 Lofink
4,910,519 A 3/1990 Duell et al.
5,305,647 A * 4/1994 Atkinson ............... 73/233
5,970,791 A * 10/1999 Barczynski et al. ....... 732/261
6,098,456 A * 8/2000 Munck ............... 73/275
6,453,721 B1 9/2002 Grzeslo et al.

OTHER PUBLICATIONS

Romet Limited, Positive Displacement Rotary Meter, Measuremnt Canada—An Agency of Industry Canada, Approval No. AG-0316 Rev. 2, Project: AP-AG-02-0028, pp. 1 to 13, Jan. 29, 2003.
Romet Limited, "Brochure" Ensure Your Gas Registration—Today's Technology, Yesterday's Reliability, Jul. 2005.

* cited by examiner

*Primary Examiner*—Harshad Patel
(74) *Attorney, Agent, or Firm*—Bereskin & Parr; Isis E. Caulder

(57) ABSTRACT

A tracking assembly and method for tracking the operation of a rotary gas meter that has a driven member includes a connecting member, a gear assembly and a mechanical counter. The connecting member is adapted to be coupled to the driven member. The gear assembly is adapted to be coupled between the connecting member and the mechanical counter. The mechanical counter is used to count a value that is directly proportional to the number of rotations of the driven member when the connecting member is coupled to the driven member. The value provided by the mechanical counter is multiplied by a conversion factor such that the associated volume of gas displaced by the gas meter can be determined.

10 Claims, 3 Drawing Sheets

GAS METER OPERATION TRACKING ASSEMBLY

This application claims the benefit under 35 U.S.C. 119(e) of U.S. Provisional Application No. 60/599,871, filed Aug. 10, 2004.

FIELD OF THE INVENTION

The present invention relates generally to gas meter equipment and more particularly to a gas meter operation tracking assembly.

BACKGROUND OF THE INVENTION

Gas meters, particularly for industrial use, are required to measure large volumes of gas for heating or cooling purposes. Most gases are normally sold to the industrial user on the basis of price per volume. Natural gas is a relatively expensive commodity and when used at high volume rates it is necessary to accurately measure the amount of gas being consumed. Accurate measurement prevents the consumer from being overcharged by the provider and it also ensures that the consumer is charged for the gas provided.

A common method of providing accurate measurement of consumed gas is the use of positive displacement rotary gas meters, specifically those that are electronically compensated. When gas flows through such rotary gas meters, fixed volumes of gas are displaced by, for example, two figure-eight impellers that rotate in opposite directions within a cylinder of known volume. The impellers of the meter rotate because of a lower differential pressure at the outlet of the meter than is present at the inlet. As they rotate, a fixed volume of gas or other fluid is entrapped and then moved toward the outlet. Therefore, with each full rotation a known volume of gas or other fluid is displaced through the outlet.

By measuring the number of rotations of the impellers, the volume of gas or other fluid displaced over a period of time can be determined. And because the lobed figure-eight impellers remain in a fixed relative position, it is only necessary to measure the rotational movement of one of them. To accomplish this, normally, the impeller is magnetically coupled to an electronic recording device or geared to a mechanical register.

Typically, a magnetic coupling device senses movement of the impellers by sensing the passage of magnets fixed to the rotating impellers. This is done with a Wiegand sensor mounted outside the pressure body of the gas meter. The sensor then transfers a signal to the electronic recording device. This device compensates for density changes due to temperature fluctuations in the gas being metered, resulting in an extremely accurate measurement of the consumed gas.

However, electronically compensated gas meters can fail to record the amount of volume passing through it for a variety of reasons. The most common failures are due to power loss, faulty electronic components, and failures due to lightning or vandalism. If the module assembly stops recording for any reason, there is a need for a device to account for the flow. Billions of dollars are lost each year by gas providers over disputes with consumers as a result of failures of electronically compensated gas meters.

A mechanical register can conveniently account for the flow in the event of a failure of an electronically compensated gas meter. Typically, such mechanical registers display the unconverted volume of consumed gas. This displayed volume can be used to determine the amount of gas that has flowed through the pressure body and acts as a backup to the electronic recording device.

The mechanical register uses a complicated gear assembly that is mechanically actuated by the rotation of the impellers of the gas meter and which in turn drives a series of gear combinations in response to the displacement of gas through the meter which in turn drives the uncorrected volume register, as it is conventionally known. That is, gas flowing through the meter causes rotation of the impeller of the gas meter, which actuates a gear drive assembly to measure actual volume of gas flowing through the meter without regard to the temperature.

However, such complicated mechanical registers limit the performance of gas meters by affecting the measurement of low gas flow rates. By using a complicated gearbox, torque from the gears interferes with the impellers by creating a pressure drop between the two sides of the impellers. This, in turn, impairs the ability to measure low flow rates because, at low flow, the torque from the gears significantly affects the normal rotation of the impellers.

It is desirable to minimize the pressure drop that is caused by the mechanical register, thereby permitting the impellers to rotate in a normal manner, especially to maintain the ability to accurately measure low gas flow rates. Accordingly, there is a need for an improved mechanical backup measuring device, which allows for the consumer or gas provider to resolve disputes over the amount of gas used without affecting the measurement of low gas flow rates.

SUMMARY OF THE INVENTION

The present invention in one aspect provides a tracking assembly for tracking the operation of a rotary gas meter having a driven member, said assembly comprising:
 (a) a mechanical counter adapted to be coupled to the driven member, such that when the mechanical counter is coupled to the driven member, the mechanical counter generates a value that is directly proportional to the number of rotations of the driven member;
 (b) means for providing a conversion factor associated with the gas meter; and
 (c) means for multiplying the value generated by the mechanical counter by the conversion factor to determine the volume of gas that has been displaced by the gas meter.

The present invention in another aspect provides a method for tracking the operation of a rotary gas meter having a driven member, said method comprising:
 (a) connecting a mechanical counter to the driven member;
 (b) operating the mechanical counter so that the mechanical counter generates a value that is directly proportional to the number of rotations of the driven member;
 (c) providing a conversion factor associated with the gas meter; and
 (d) multiplying the value by the conversion factor to determine the volume of gas displaced by the gas meter.

Further objects and advantages of the invention will appear from the following description, taken together with the accompanying drawings.

DETAILED DESCRIPTION OF THE INVENTION

Figure 1A:
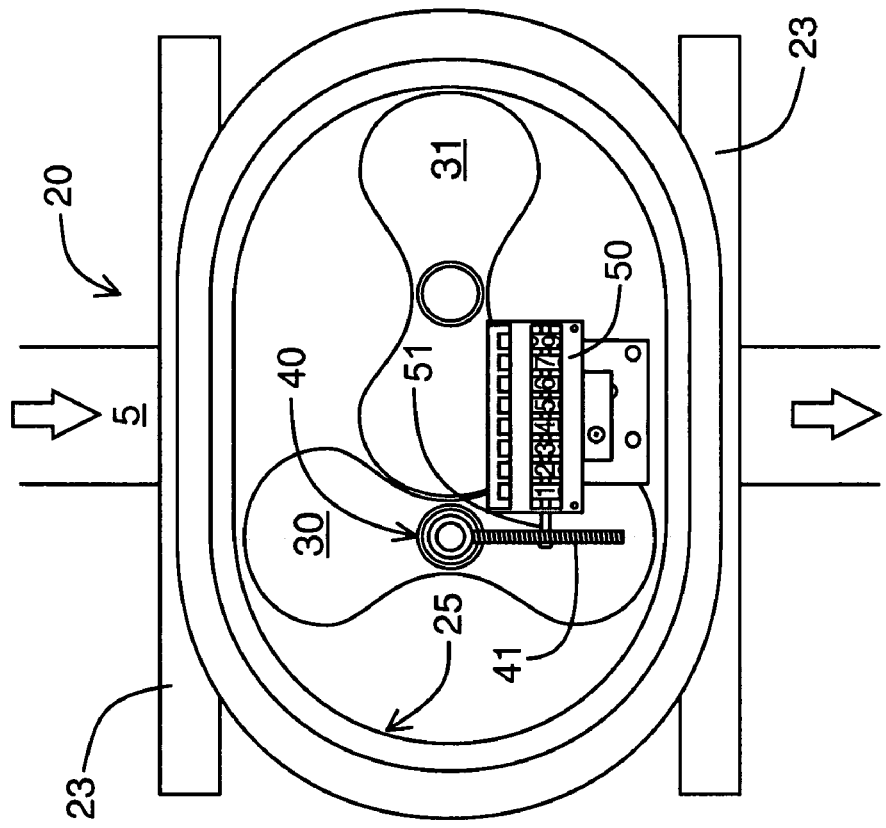
FIG. 1A is a side partial cross-sectional view of a conventional gas meter in service and fitted with a conventional electronic measuring device and associated with the counting device of the present invention.
Figure 1B:
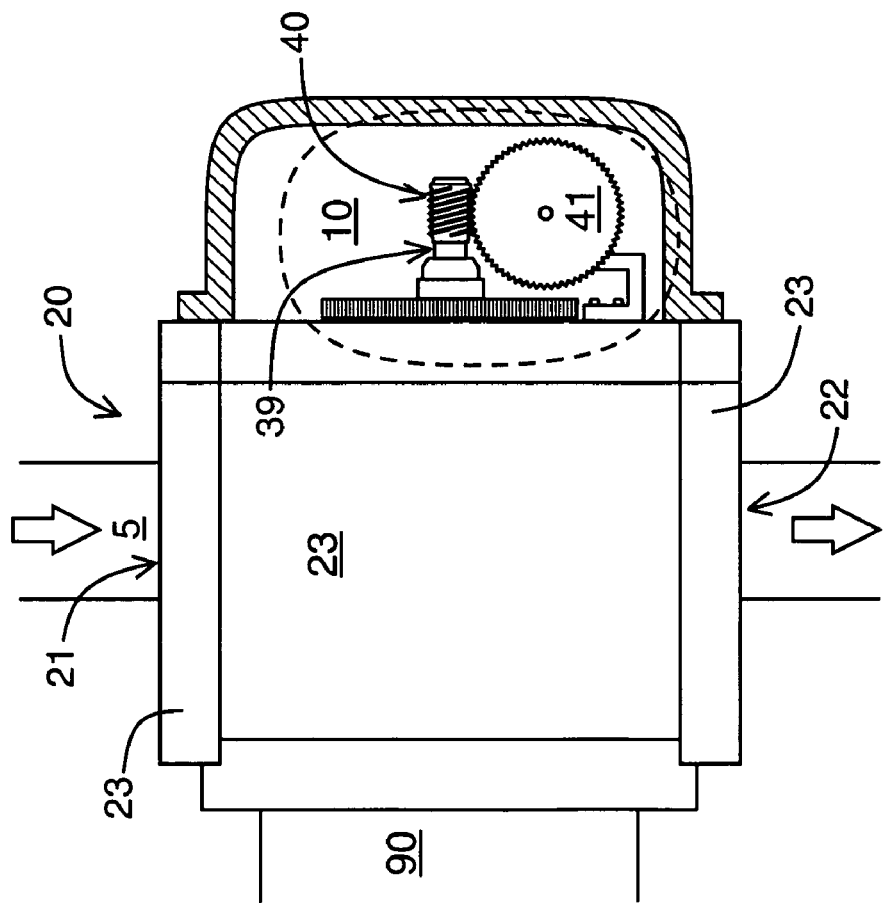
FIG. 1B is a front partial cross-sectional view of the gas meter of FIG. 1A associated with the counting device of FIG. 1A.

FIGS. 1A and 1B illustrate an example of a tracking assembly 10 built in accordance with a preferred embodiment of the invention. The tracking assembly 10 is used in association with a conventional rotary gas meter 20 having a driven member (e.g. impellers 30, 31) and a housing 23. The tracking assembly 10 includes a connecting member 39, a drive gear 40, a worm gear 41, and a mechanical counter 50. The tracking assembly 10 is adapted to be coupled to at least one driven member (e.g. at least one of impellers 30, 31) of a conventional gas meter 20. The tracking assembly 10 provides a value that can be read off a mechanical counter 50 that is directly proportional to the amount of rotations of the driven member of the gas meter 20.

The connecting member 39 is preferably a cylindrical bar that is coupled to the shaft of an impeller 30, 31 and which extends out of the gas meter 20 in a direction that is opposite to the electronic compensator 90.

The drive gear 40 is fixedly coupled to the end of connecting member 39 and is a conventional drive gear having gear teeth. The worm gear 41 is a conventional worm gear having gear teeth that are adapted to interlock with the gear teeth of the drive gear 40. Drive gear 40 and worm gear 41 can be made of durable plastic or metal.

As shown, the drive gear 40 of tracking assembly 10 is coupled to the impeller 30 using a connecting member 39. It should also be noted that the drive gear 40 can be coupled with either or both of the impellers 30, 31 of the meter because they rotate synchronously, in a fixed relative position. In the preferred embodiment as shown in FIGS. 1A and 1B, there are two impellers 30, 31 and the drive gear is coupled with one impeller 30.

The mechanical counter 50 is coupled to the worm gear 41 and is a conventional mechanical counter. The mechanical counter 50 measures the number of rotations of the counter shaft 51 and provides a numerical reading of the number of rotations on its face as shown. The mechanical counter 50 can be any commercially available counter (e.g. those manufactured by Veeder-Root Inc. of Connecticut, U.S.A.).

The tracking assembly 10 will be described specifically in relation to a conventional electronically compensated gas meter (e.g. ROMET ECM2 or PTZ/ECM2, manufactured by the applicant) which consists of the combination of a gas meter 20 and an electronic compensator 90. However, while the present invention is being described in relation to a conventional positive displacement rotary gas meter 20, it should be understood that tracking assembly 10 could be utilized with any type of gas meter.

As shown in FIGS. 1A and 1B, natural gas flows from a pipeline 5 and enters the pressure body of gas meter 20 at a gas meter intake 21. After passing through the gas meter 20, the gas exits through the outlet 22 where it is then routed to the consumer. While the present description is being provided assuming that medium of natural gas, it should be understood that the positive displacement meter 20 could be used to measure any type of gas or other fluid.

The gas meter 20 includes a housing 23 within which the gas flows and impellers 30, 31 rotate. At each position of impellers 30, 31, a defined space is formed between the impeller 30 and the inside of gas meter wall 25. Accordingly, a known fixed volume of gas is discharged by every rotation of the impellers 30, 31 which is an important feature in a "positive displacement" meter. The impellers 30, 31 and gas meter 20 are designed so that all spaces between surfaces (.e.g. walls, end plates and impellers) are positioned within close tolerances of each other.

Figure 2A:
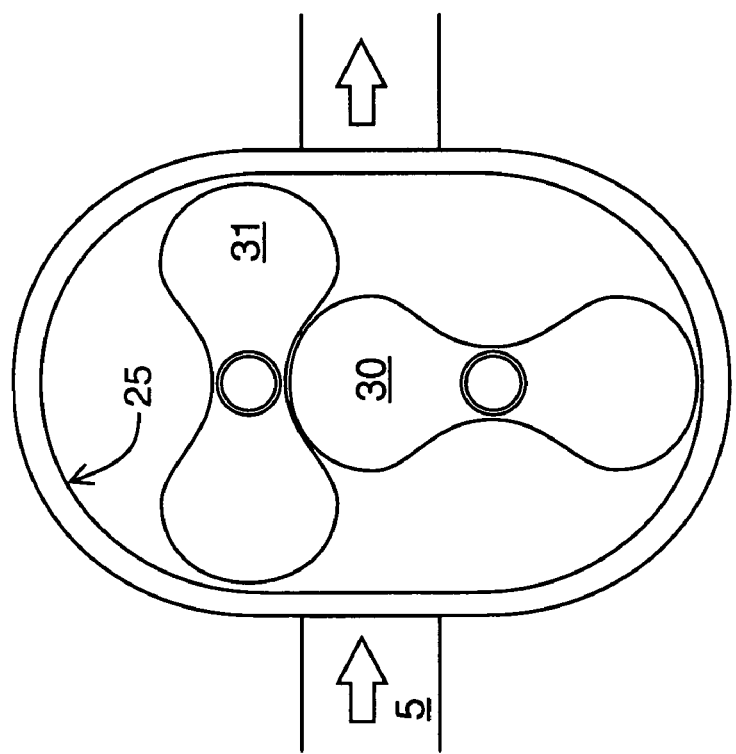
FIG. 2A illustrates a first position of the rotating impellers of FIG. 1B during operation.
Figure 2B:
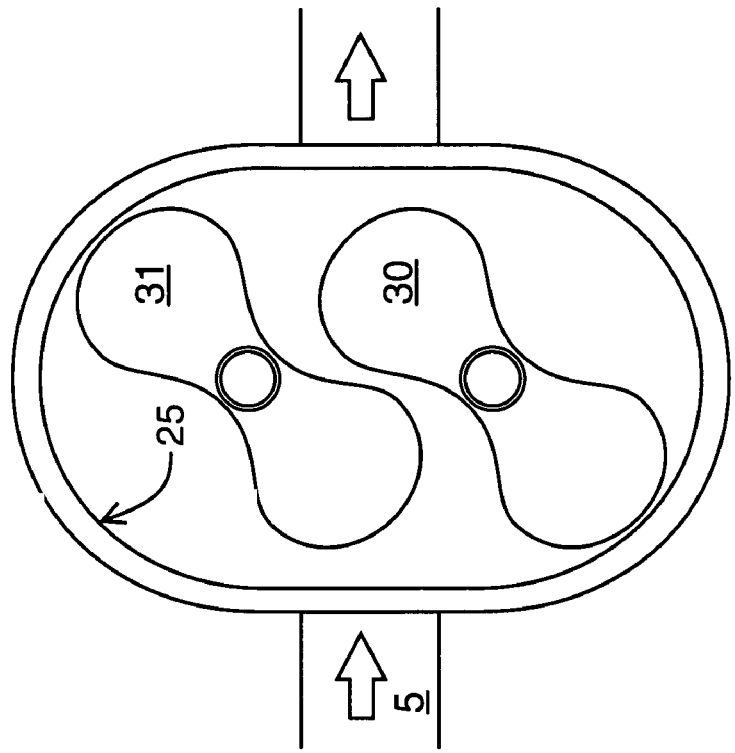
FIG. 2B illustrates a second position of the rotating impellers of FIG. 1B during operation.

FIGS. 2A and 2B illustrates how the gas flow creates a force on the impellers 30 and 31. This force causes the impellers 30 and 31 to rotate as illustrated. It should be understood that while the preferred embodiment discloses a positive displacement rotary meter with two lobed impellers 30, 31, it should be understood that other embodiments of the invention are contemplated. These other embodiments include positive displacement rotary meters with driven member(s) having different physical configurations (e.g. a positive displacement rotary meter having only one driven member).

Referring back to FIG. 1A, the gas meter 20 is typically also associated with an electronic compensator 90. The electronic compensator 90 is typically mounted on one side of the gas meter 20 as shown. The electronic compensator 90 compensates for changes in the density of the gas due to fluctuations in temperature, as flow data is being recorded.

Specifically, the electronic compensator 90 measures the rotation of the impeller 30 by magnetically coupling it to the electronic recording device (not shown). A magnetic coupling device senses movement by sensing the passage of magnets fixed to the rotating impellers 30, 31. This is accomplished using a Wiegand sensor mounted externally of the pressure body of the gas meter 20. The Wiegand sensor then transfers a signal to the electronic recording device. The electronic compensator 90 compensates for density changes due to temperature fluctuations in the gas being metered, resulting in an accurate measurement of the consumed gas. As is conventionally known, all recording devices (i.e. mechanical or electronic) are mounted on the magnetic housing and according to industry standard.

As shown, the tracking assembly 10 is preferably located on the opposite side of the gas meter 20 to the electronic compensator 90. Referring again to FIG. 1A, it should be noted that in the preferred embodiment, the electronic compensator 90 and mechanical counter 50 are coupled on opposite ends of the impellers and on opposite sides of the gas meter 20. This arrangement allows for minimal re-tooling and provides a cost effective way to track gas meter operation.

Referring back to FIG. 1B, the drive gear 40 is further meshed with the worm gear 41, which is in turn coupled to a conventional mechanical counter 50. That is, gas flowing through the gas meter 20 causes rotation of the impeller 30, which actuates a mechanical counter 50 using a simple drive gear train to count a number directly proportional to the number of rotations of the impeller 30. It should be understood that while it is preferable to use a drive gear 40 and worm gear 41 as the gear train, any combination of gears could be used to couple the impeller 30 and the mechanical counter 50. Further, it should be understood that it is also possible for the impeller 30 to be directly connected to the mechanical counter 50 without any intermediate gears.

The inventors have determined that the more complicated the gear train, the more difficult it is to ensure proper measurement of low gas flow rates. By using a gear train with minimal components, the friction in the gear train is reduced and the energy needed to move the gear train and counter is reduced. With a more complicated gear train, a significant proportion of the energy embodied in the gas flow is used to overcome the torque created by the gear train and counter. This creates errors in measuring low flow rates and should be avoided. Also, a simple gear train produces a minimal pressure drop which in turn allows the impellers to rotate in a normal manner. This provides ability to accurately measure low gas flow rates. It has been determined that the preferred embodiment of tracking assembly 10 is able to measure gas flow rates at 0.02 m$^3$/h or lower.

The specific drive and worm gear combination shown in FIGS. 1A and 1B has been designed to change the orientation of the rotating movement so that the space the mechanical counter inhabits is minimized. It should be noted that there are many other gear combinations that could be used for this purpose.

Figure 3:
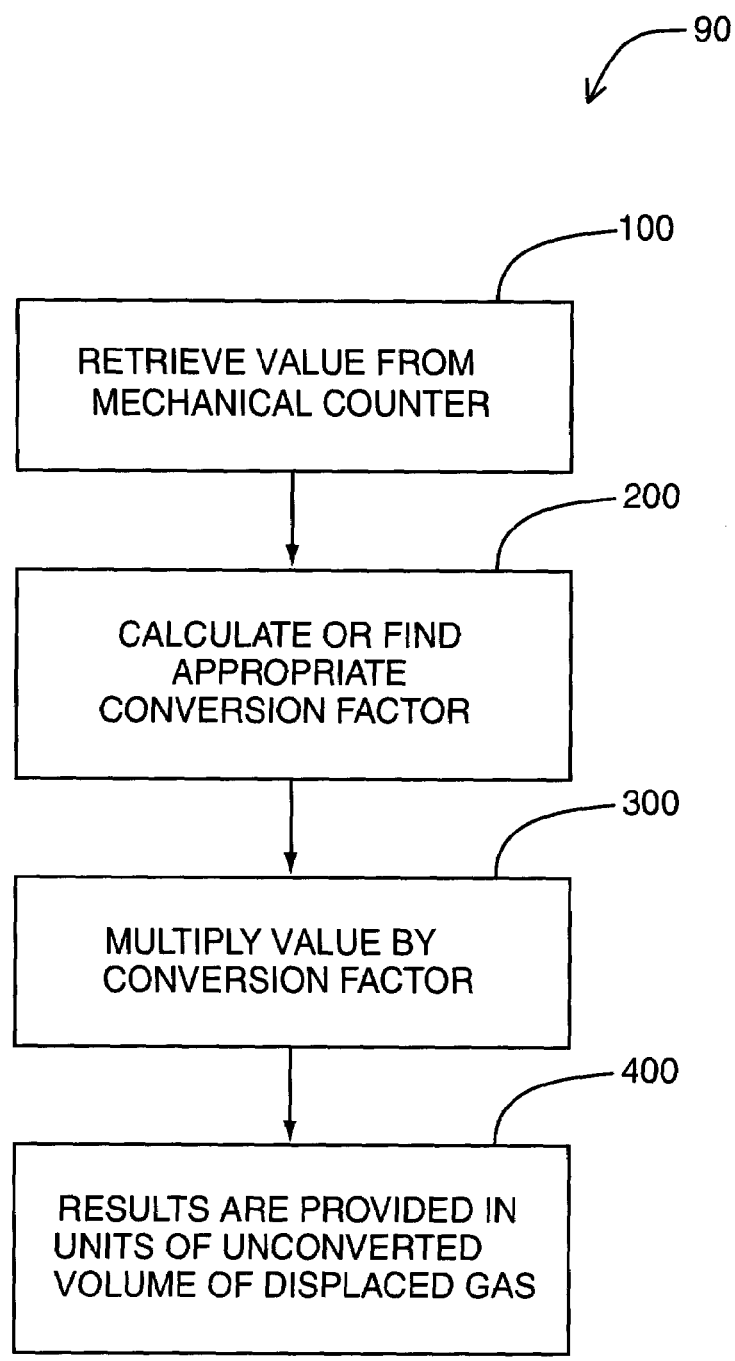
FIG. 3 is flowchart outlining the process of converting a number proportional to the number of rotations of the impeller to the associated unconverted volume displaced.

Now referring to FIG. 3, the overall process steps 90 executed when mechanical counter 50 is used to track the operation of rotary gas meter 20 are illustrated.

Specifically, at step (100), the value on the mechanical counter 50 is retrieved. At step (200), the appropriate conversion factor is determined. This determination can be made based on the type of gas meter 20 being tracked (e.g. by part or make number). At step (300), the value on the mechanical counter 50 is multiplied by the conversion factor to calculate the unconverted volume of gas that has been displaced by the gas meter 20. At step (400) the results are determined and utilized.

It should be noted that the value appearing on the mechanical counter 50 could be manipulated in a variety of ways to determine the amount of gas consumed over a period of time. However, the conversion factor determined at step (200) will be needed for the conversion in to volume of gas displaced at steps (300) and (400). The conversion factor is proportional to the size of the gas meter and the gear ratio used in the gear combination, which couples the impeller 30 with the mechanical counter 50. The conversion factors are determined by calculating the specific displacement generated by each type (or size) of gas meter 20.

Another aspect of the invention is that mechanical counter 50 tracks the number of rotations of the impeller 30 for the life of the gas meter 20. This is valuable because typically it is difficult to measure the life of a gas meter 20. Since mechanical counter 50 counts throughout the whole life of the gas meter 20 the value displayed on the mechanical counter 50 can be used to measure the life of a gas meter 20. Accordingly, the counter 50 can be used to provide a measure of future life expectancy and thus its future operational value.

As will be apparent to persons skilled in the art, various modifications and adaptations of the structure described above are possible without departure from the present invention, the scope of which is defined in the appended claims.

The invention claimed is:

1. A tracking assembly for tracking the operation of a rotary gas meter in the presence of a gas flow having a driven member adapted to be directly driven by the gas flow, the gas meter being provided with an electronic compensator for measuring flow volume on a first end of the gas meter, the tracking assembly providing a backup measurement of the volume of gas flow through the rotary gas meter for the electronic compensator, said tracking assembly comprising:

(a) a backup mechanical counter adapted to be coupled to the driven member on a second end of the gas meter, such that the backup mechanical counter is located on the opposite end of the gas meter from the electronic compensator and operates independently of the electronic compensator, such that when the backup mechanical counter is coupled to the driven member, the backup mechanical counter generates a value that is directly proportional to the number of rotations of the driven member;

(b) means for providing a conversion factor associated with the gas meter; and (c) means for multiplying the value generated by the backup mechanical counter by the conversion factor to determine a backup measurement of the volume of gas that has been displaced by the gas meter which can be utilized in case of failure of the electronic compensator.

2. The tracking assembly of claim 1, wherein said backup mechanical counter is adapted to be directly coupled to the driven member of the gas meter.

3. The tracking assembly of claim 1, wherein said backup mechanical counter is adapted to be coupled to the driven member of the gas meter through a gear train, said gear train including at least two gears.

4. The tracking assembly of claim 3, wherein said gear train consists of a worm gear and a drive gear, where the worm gear is adapted to mesh within the drive gear.

5. The tracking assembly of claim 3, wherein said conversion factor is directly proportional to the gear ratio of said gear train.

6. A method for tracking the operation of a rotary gas meter in the presence of a gas flow having a driven member adapted to be directly driven by the gas flow, the gas meter being provided with an electronic compensator for measuring flow volume on a first end of the gas meter, the method providing a backup measurement of the volume of gas flow through the rotary gas meter for the electronic compensator, said method comprising:

(a) connecting a backup mechanical counter to the driven member on a second end of the gas meter, such that the backup mechanical counter is located on the opposite end of the gas meter from the electronic compensator;

(b) operating the backup mechanical counter independently of the electronic compensator so that the backup mechanical counter generates a value that is directly proportional to the number of rotations of the driven member;

(c) providing a conversion factor associated with the gas meter; and (d) multiplying the value by the conversion factor to determine a backup measurement of the volume of gas displaced by the gas meter which can be utilized in case of failure of the electronic compensator.

7. The method of claim 6, wherein said backup mechanical counter is directly coupled to the driven member of the gas meter.

8. The method of claim 6, wherein said backup mechanical counter is coupled to the driven member of the gas meter through a gear train, said gear train including at least two gears.

9. The method of claim 8, wherein said gear train consists of a worm gear and a drive gear, where the worm gear is adapted to mesh within the drive gear.

10. The method of claim 8, wherein said conversion factor is directly proportional to the gear ratio of said gear train.

* * * * *